(12) United States Patent
Ulbrich

(10) Patent No.: US 7,416,502 B2
(45) Date of Patent: Aug. 26, 2008

(54) HYDROSTATIC MECHANICAL POWER-SPLIT TRANSMISSION

(75) Inventor: Peter Ulbrich, Behamberg (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 327 days.

(21) Appl. No.: 10/581,282

(22) PCT Filed: Dec. 14, 2004

(86) PCT No.: PCT/EP2004/014203

§ 371 (c)(1),
(2), (4) Date: Jun. 1, 2006

(87) PCT Pub. No.: WO2005/068877

PCT Pub. Date: Jul. 28, 2005

(65) Prior Publication Data

US 2007/0105680 A1 May 10, 2007

(30) Foreign Application Priority Data

Jan. 14, 2004 (DE) .................... 10 2004 001 929

(51) Int. Cl.
*F16H 47/04* (2006.01)
(52) U.S. Cl. ............................................. 475/72
(58) Field of Classification Search .................. 475/72, 475/83
See application file for complete search history.

(56) References Cited

U.S. PATENT DOCUMENTS

| 3,969,958 | A | 7/1976 | Miyao et al. | |
|---|---|---|---|---|
| 4,429,593 | A | 2/1984 | Michael | |
| 5,052,986 | A | 10/1991 | Jarchow et al. | |
| 5,080,637 | A | 1/1992 | Tenberge et al. | |
| 5,248,283 | A | 9/1993 | Eckhardt et al. | |
| 5,496,223 | A | 3/1996 | Jarchow | |
| 5,643,121 | A * | 7/1997 | Greenwood et al. | 475/72 |
| 5,888,162 | A | 3/1999 | Moeller et al. | |
| 5,976,046 | A * | 11/1999 | Larkin | 475/72 |
| 6,042,496 | A | 3/2000 | Lehle et al. | |
| 6,080,074 | A * | 6/2000 | Ulbrich et al. | 475/76 |
| 6,616,559 | B1 | 9/2003 | Hori et al. | |
| 2003/0036451 | A1 | 2/2003 | Weeramantry et al. | |

FOREIGN PATENT DOCUMENTS

| DE | 39 03 877 C1 | 9/1990 |
|---|---|---|
| DE | 40 30 050 A1 | 3/1992 |
| DE | 4200692 A1 * | 7/1993 |
| DE | 43 23 358 C1 | 5/1994 |
| DE | 100 03 174 A1 | 9/2000 |
| DE | 101 13 177 C1 | 4/2002 |
| DE | 101 22 823 A1 | 11/2002 |
| FR | 1.438.647 | 4/1966 |

(Continued)

*Primary Examiner*—Ha D. Ho
(74) *Attorney, Agent, or Firm*—Davis Bujold & Daniels P.L.L.C.

(57) ABSTRACT

A hydrostatic mechanical power-split transmission with a continuously variable gear ratio comprises a hydrostatic transmission part (1) consisting of a first hydrostatic unit (13) with an adjustable volume, a second hydrostatic unit (A) with a constant volume, and a mechanical transmission part (2) comprising a summing transmission and a range transmission, the summing transmission and the range transmission are arranged in an axially staggered manner in relation to the hydrostatic units.

11 Claims, 1 Drawing Sheet

FOREIGN PATENT DOCUMENTS

| | | |
|---|---|---|
| GB | 2 261 039 A | 5/1993 |
| JP | 02300551 A * | 12/1990 |
| JP | 2000-130556 | 5/2000 |
| WO | WO-97/01049 | 1/1997 |
| WO | WO-99/15813 | 4/1999 |

* cited by examiner

HYDROSTATIC MECHANICAL POWER-SPLIT TRANSMISSION

This application is a national stage completion of PCT/EP2004/014203 filed Dec. 14, 2004 which claims priority from German Application Serial No. 10 2004 001929.0 filed Jan. 14, 2004.

FIELD OF THE INVENTION

The invention relates to a hydrostatic, mechanical, power-split transmission for motor vehicles, especially agricultural commercial vehicles.

BACKGROUND OF THE INVENTION

Hydrostatic, mechanical, power-split transmissions are comprised of one continuously variable hydrostatic transmission having one adjustable volume and one constant volume unit, one summarizing transmission and one range-change transmission with several shiftable gears. The power introduced, via an input shaft splits, on one side to the hydrostatic transmission and, on the other, to an input shaft of the summarizing transmission. The rotational speeds and torques of the hydrostatic transmission and of the prime mover are jointly passed by the summarizing transmission. Different gears can be selected with the aid of gear clutches by the output shaft of the summarizing transmission being coupled via different spur gear steps with the output shaft. Compared with mechanical transmission, continuously variable transmissions have the advantage that it is possible to drive at optimal rotational speed of the motor with no traction interruption occurring when shifting.

DE 39 03 877 discloses a hydrostatic, mechanical, power-shift transmission consisting of a four-shaft gear, planetary transmission and parallel therewith a continuously variable hydrostatic transmission, the same as other gears. By shifting gear clutches, several gears are implemented in each of which the hydrostatic transmission effects a continuous adjustment of the ratios of the whole transmission. In case of synchronous rotational speeds, the change of gear is effected load-free and without traction interruption. By virtue of the structure of the gear clutches and of the control provided, it is possible to activate a new gear and subsequently deactivate the old gear without any jolt during the shift operation. The reverse gear is implemented by its own gearset and a corresponding clutch adjustment, which is to be actuated, for activating the reverse gear.

From WO 97/01049 is known a power-split transmission provided with a mechanical and hydrostatic power branch disposed in a transmission housing. Both branches are operated, via a common input shaft, and summarized in a coupling gear. The coupling gear has several planetary gearsets and clutches and is connected with on output shaft. The coupling gear is situated upon the input shaft. The last planetary gearset of the coupling gear can be connected with a clutch for forward and reverse gears, said clutches being connectable with the output shaft. The operation change from forward to reverse gear and vice versa is effected via the interplay of the clutches. When stopped at zero rotational speed, both clutches are closed. Therefore, depending on the travel direction desired, the corresponding clutch has to be actuated first.

In WO 99/15813 are shown different embodiments of a hydrostatic, mechanical, power-split transmission in which at least the summarizing transmission and the clutches or also the hydrostatic transmission are situated co-axially relative to each other (in-line design). To adapt the traction needed, a group transmission can be provided having, for example, one field and one road group. The change between these groups, the same as between forward and reverse gear, is implemented by actuating a corresponding clutch. The shift to the other respective range is preferably effected after a defined dwelling time on the corresponding ratio point or within a delimited ratio range, i.e., during stoppage or constant speed.

Those transmissions, however, have a basic problem in common that the hydrostatic transmission is connected with a gear transmission, therefore, they no longer constitute a really continuously variable transmission. The shifting of clutches are needed for changing to different ranges, especially when changing from forward to reverse gear and vice versa. The actuation of clutch devices is required, whereby a traction interruption and time delay result negatively impairing the traveling comfort.

Mainly in agricultural, commercial vehicles, the gear change operation between opposite travel directions acts negatively upon the driving properties, such as the efficiency degree when starting. At the starting point, high idle power can appear which can correspond to a multiplication of the input power. This negatively affects the dimensions and weight of the transmission.

The Applicant's DE 101 22 823 A1 discloses a power-split transmission having one hydrostatic part, one summarizing transmission and one range change transmission in which a purely hydrostatic transition driving range is provided for speeds between low reverse gear and low forward gear without a range transfer and without shifting of clutches, especially at zero speed and, attached thereto, a continuously variable hydrostatic, mechanical, speed range with power-split for high speeds. The hydrostatic transmission part, the summarizing transmission and the range change transmission are disposed co-axial with each other upon the intermediate shaft.

Thereby no range transfer is required when changing from low forward and reverse speeds so that in this speed range the shifting of clutches is eliminated, but the length has proved disadvantageous.

The problem on which this invention is based is, starting from said prior art, to provide a hydrostatic, mechanical, power-split transmission in which at zero speed, no clutches have to be shifted, a change of travel direction between forward and reverse is possible without delays, which has a good degree of efficiency and makes do with few speed ranges. Besides, the required length is to be considerably reduced compared to the prior art.

SUMMARY OF THE INVENTION

A hydrostatic, mechanical, power-split transmission with continuously variable ratio is accordingly provided which has one hydrostatic part consisting of a first hydrostatic unit with adjustable volume and a second hydrostatic unit with constant volume and a mechanical part comprising one summarizing transmission and one range change transmission in which the summarizing transmission and the range change transmission are disposed not co-axially, but axially staggered relative to the hydrostatic units.

From the inventive idea advantageously results a very short length.

The summarizing transmission is preferably designed as a three-step, planetary transmission and has no ring gears whereby the center distance between the crankshaft and the middle of the rear axle can be kept small. The range change transmission preferably has a four-step design.

According to the invention, the necessary gears, shafts and clutches are laid out so that equal parts result which can be used in several areas.

Both the summarizing planetary transmission and the four-step, range change transmission with the appertaining dog clutches can be pre-assembled in the rear transmission housing. Thereafter the front housing can be slipped over, via the pre-assembled unit and screwed to the rear housing. In addition, hydrostatic units, pressure and lubrication pump, pressure filters, magnetic valves and electronic systems can be pre-assembled in a module which can be assembled on a lateral aperture of the front transmission housing.

The inventive transmission has one purely hydrostatic, transition, drive range for speeds between low reverse speed and low forward speed without a range transfer and without shifting of clutch devices and attached thereto one continuously variable, hydrostatic, mechanical drive range with power-split for higher speeds.

BRIEF DESCRIPTION OF THE DRAWINGS

The invention will now be described, by way of example, with reference to the accompanying drawings in which.

DETAILED DESCRIPTION OF THE INVENTION

Figure 1:
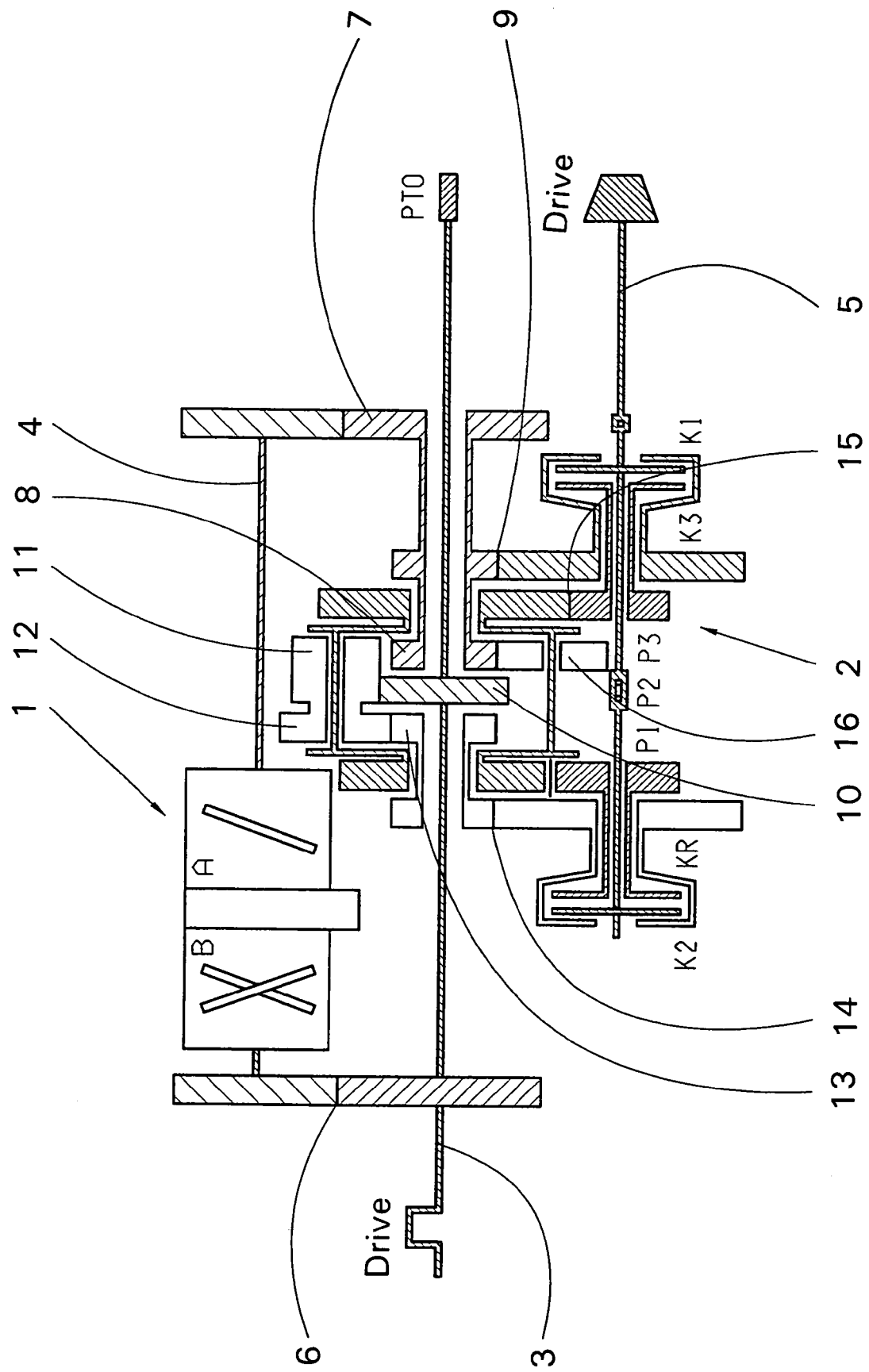
FIG. 1 is a diagrammatic representation of a preferred embodiment of an inventive transmission.

The general construction and operation of the hydrostatic, mechanical, power-split transmission are well known to the expert. Therefore, only the characteristics of the instant invention will be discussed here.

FIG. 1 shows an inventive hydrostatic, mechanical, power-split transmission having one hydrostatic part 1 and one mechanical part 2. It comprises one input shaft (crank-shaft) 3, one intermediate shaft 4, which forms the output of the hydrostatic part 1 and one output shaft 5. The input shaft 3 can be passed throughout the transmission and serve as PTO connection or power take off drive.

The hydrostatic transmission part 1 is formed by one hydrostatic unit A in the form of a constant motor and by a second hydrostatic unit B in the form of a variable pump preferably in "back to back" arrangement. Both units A and B are driven by the input shaft 3 via a spur gear pair 6.

The mechanical, transmission part 2 comprises a summarizing transmission, preferably designed as a three-step planetary transmission without ring gears. In the Figure, the three planetary steps are provided with the references P1, P2 and P3. The range change transmission contained in the mechanical transmission part 2 has four spur gear steps. As can be seen from the Figure, the summarizing transmission and the range change transmission are situated axially staggered relative to the hydrostatic units so that a specially compact design results. Clutch devices K1, K2, K3, KR for the spur gear steps of the range change transmission are situated upon the output shaft 5; the clutch K1 loosely connecting, via a spur gear step 9, the output shaft with a sun gear 8 of the third planetary set, the clutch K2 loosely connecting, via a spur gear step 14, the output shaft 5 with a sun gear 13 of the first planetary set P1; the clutch K2 loosely connecting, via a spur gear step 15, the output shaft 5 with the planet carrier of the second planetary set P2, and the clutch KR loosely connecting, via an intermediate gear and spur gear step, the output shaft 5 with the planet carrier of the first planetary step P1.

The inventive power-split transmission operates as follows: the vehicle is started purely hydrostatically in the transition range. The rotational speed of the hydrostatic transmission part 1 is passed via two spur gear steps 7 and 9 to the output shaft 5, the clutch K1 is closed and forms the start and remains in gear over the whole range of the transition, drive range. By an adjustment of the variable pump B, the original rotational speed can be adjusted between negative and positive rotational speeds within the range. Thereby a speed range of about −5 km/h to +5 km/h can be covered. Advantageously, no gearshift is required in the transition from forward to reverse gear and vice versa.

For higher speeds, the hydrostatic transmission part 1 and the mechanical transmission part 2 are combined to form several power-split ranges. On one hand, the power is passed from the hydrostatic transmission part 1, via the intermediate shaft 4 and the spur gear step 7, to the sun gear 8 of the planetary step P3 and, on the other, via the input shaft directly to a sun gear 10 of the planetary step P2. According to the invention, the planets of the planet steps are constantly in gear directly or indirectly with each other; a planet 16 of the third planet step P3 is in gear with a planet 11 of the second planetary step P2 and the planet of the second planetary step P2 is connected with a planet 12 of the first planetary step P1.

The output for the first forward drive range results by shifting the clutch K2. The power is here transmitted from the sun gear 10 of the planetary step P2 to the output shaft 5 via the planets 11 of the second planetary step, the planets 12 of the first planetary step P1, the sun gear 13 of the first planetary step P1 and one spur gear step 14.

In the second forward drive range, the clutch K2 is closed. The power is here transmitted from the sun gear 10 of the planetary step P2 to the output shaft via the planet carrier of the planetary step P2 and the spur gear step 15.

For the reverse gear, the clutch KR is closed; power is transmitted from the sun gear 10 of the planetary step P2 to the output shaft, via the planet carrier of the planetary step P1 and an intermediate gear.

This distribution of the total drive range into one purely hydrostatic transition range for low forward and reverse speeds and one power-slit drive range for high speeds, results in a shuttle fit transmission which makes a change of travel direction possible without any delay and power interruption. The speed values for the drive ranges are approximately between 5 and 20 km/h for the reverse range, and between 13 and 50 km/h for the third range. It is possible to cover other speed ranges by changing the gear ratio of the spur gear steps.

Any structural design, especially any spatial arrangement of the planetary steps and of the shifting elements per se, the same as relative to each other and, insofar as technically significant, fall under the scope of protection of these claims without affecting the operation of the transmission, such as indicated in the claims, even if said designs are not explicitly shown in the Figure or in the description.

REFERENCE NUMERALS

1 hydrostatic transmission part

2 mechanical transmission part

3 input shaft

4 intermediate shaft

5 output shaft

6 spur gear step

7 spur gear step

8 sun gear 9 spur gear step
10 sun gear
11 planet
12 planet
13 sun gear
14 spur gear step
15 spur gear step
16 planet
A hydrostatic unit, constant motor
B bydrostatic unit, variable pump
K1 clutch
K2 clutch
K3 clutch
KR clutch
P1 planetary step
P2 planetary step
P3 planetary step

The invention claimed is:

1. A hydrostatic, mechanical, split-power transmission with a continuously variable gear ratio which includes a hydrostatic part (1) comprising a first hydrostatic unit (B) with a variable volume and a second hydrostatic unit (A) with a constant volume and a mechanical part (2) comprising a summarizing transmission and a range change transmission;

wherein the summarizing transmission and the range change transmission are axially staggered relative to the first hydrostatic unit (B) and the second hydrostatic unit (A) with a first clutch, a second clutch, a third clutch, and a fourth clutch (K1, K2, K3, KR) for a plurality of spur gear steps of the range change transmission, the first, the second, the third, and the fourth clutches (K1, K2, K3, KR) are located on an output shaft (5), the first clutch (K1) releasably connects the output shaft (5) via a third spur gear step (9), the second clutch (K2) releasably connects the output shaft (5) with a spur gear (13) of a first planetary gearset (P1) via a fourth spur gear step (14), the third clutch (K3) releasably connects the output shaft (5) with a planet carrier of a second planetary gearset (P2) via a fifth spur gear step (15) and the fourth clutch (KR) releasably connects the output shaft (5) with a planet carrier of the first planetary gearset (P1) via an intermediate gear.

2. The hydrostatic, mechanical, power-split transmission according to claim 1, wherein the summarizing transmission is a three-step planetary transmission comprising the first planetary gearset, the second planetary gearset and a third planetary gearset (P1, P2, P3) without ring gears and planet gears of the first, the second and the third planetary gearsets (P1, P2, P3) are directly or indirectly contacting one another.

3. The hydrostatic, mechanical, power-split transmission according to claim 1, wherein the range change transmission is a four-step transmission.

4. The hydrostatic, mechanical, power-split transmission according to claim 1, wherein a purely hydrostatic transition drive range is provided for speeds between a low reverse and low forward gears without a range transfer and without shifting of clutch devices and a continuously variable hydrostatic, mechanical range with a power-split is attached thereto for higher speeds.

5. The hydrostatic, mechanical, power-split transmission according to claim 4, wherein for the purely hydrostatic transition drive range, a rotational speed of the hydrostatic part (1) is transferred to the output shaft (5) via a second spur gear step (7) and via the third spur gear step (9), the first clutch (K1) is engaged from a start and remains engaged during an entire range of the transition drive range and by adjustment of a variable pump (B), and within at least one drive range, an initial rotational speed is adjustable between negative and positive rotational speeds.

6. The hydrostatic, mechanical, power-split transmission according to claim 4, wherein the hydrostatic, mechanical, drive range with power-split has two forward drive ranges and one reverse drive range.

7. The hydrostatic, mechanical, power-split transmission according to claim 6, wherein output for a first forward range results by shifting the second clutch (K2), and power is transmitted from a sun gear (10) of the second planetary step (P2) to the output shaft (5) via a first planet gear (11) of the second planetary step (P2), a second planet gear (12) of the first planetary step (P1), the spur gear (13) of the first planetary step (P1) and a spur gear step (14).

8. The hydrostatic, mechanical, power-split transmission according to claim 6, wherein the output for the second forward range results by shifting the third clutch (K3), and power is transmitted from the sun gear (10) of the planetary step (P2) to the output shaft (5) via the planet carrier of the planetary step (P2) and a spur gear step (15).

9. The hydrostatic, mechanical, power-split transmission according to claim 6, wherein output for the reverse range results by shifting the fourth clutch (KR), and power is transmitted from the sun gear (10) of the second planetary step (P2) to the output shaft (5) via the planet carrier of the planetary step (P1) and the intermediate gear.

10. The hydrostatic, mechanical, power-split transmission according to claim 1, wherein the summarizing transmission and the first, the second, the third, and the fourth clutches (K1, K2, K3, KR) are all pre-assembled in a rear transmission housing so as to facilitate engagement with a front transmission housing, as a pre-assembled unit, and securing to the rear transmission housing.

11. The hydrostatic, mechanical, power-split transmission according to claim 1, wherein the first hydrostatic unit (B) and the second hydrostatic unit (A), a pressure and lubrication pump, pressure filters, magnetic valves and electronic systems are pre-assembled as a module which is assembled on a lateral aperture of a front transmission housing.

* * * * *